United States Patent Office 2,748,056
Patented May 29, 1956

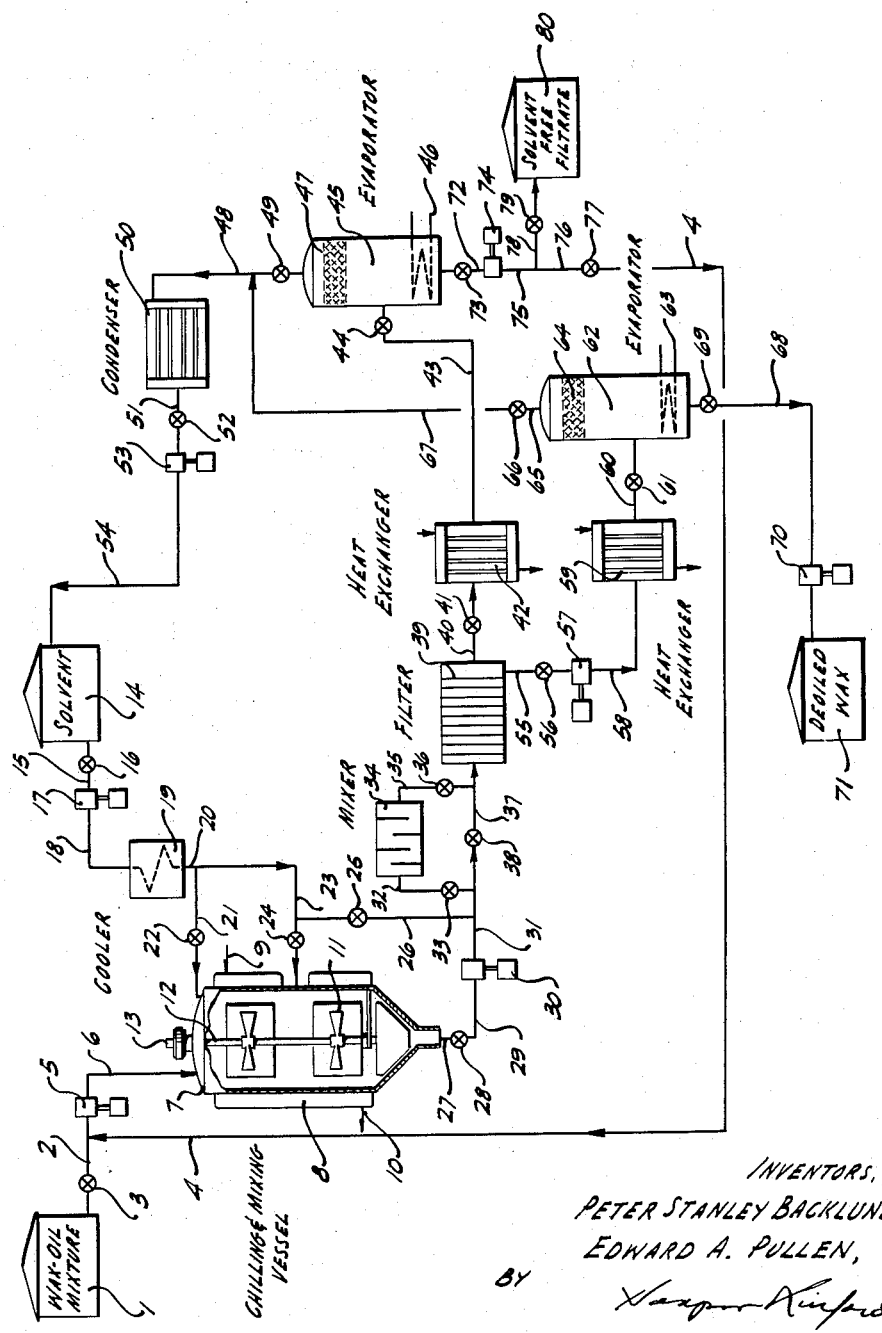

2,748,056

DEOILING OF WAX-OIL MIXTURES

Peter Stanley Backlund, Anaheim, and Edward A. Pullen, Fullerton, Calif., assignors to Union Oil Company of California, Los Angeles, Calif., a corporation of California Application September 8, 1952, Serial No. 308,332

8 Claims. (Cl. 196—20)

This invention relates to a process of treating wax-oil mixtures containing relatively high proportions of wax and particularly to methods of deoiling slack wax to produce oil-free wax and relatively wax-free oil.

In conventional processes for separating oil-free wax from slack wax, the latter is mixed with a dewaxing or deoiling solvent, as for example a low molecular weight ketone or a mixture of low molecular weight ketones with or without the addition of small amounts of aromatic solvent to improve the solubility of oil in the deoiling solvent, and the mixture of slack wax and solvent, after heating to a temperature sufficient to effect solution of the wax, is chilled to a temperature at which most or all of the wax contained in the oil is crystallized and the precipitated wax is then separated from the oil-solvent mixture by filtration. In this method of operation the wax cake obtained on the filter is very voluminous and porous and cracks badly. Washing the wax cake with additional solvent is inefficient due to the high porosity and cracking tendency of the cake. With many types of slack waxes and solvents it is necessary to add crystallization modifiers to the mixture before chilling in order to obtain a slurry which can be filtered and washed on the filter with even reasonable success.

Although it is known that wax which is separated from oil by chilling in the absence of deoiling or dewaxing solvents and subsequently is slurried with such solvents to produce a relatively non-viscous slurry of wax crystals in oil-solvent mixture is readily filtered and readily washed on the filter, this method is not applicable to the separation of oil-free wax from slack waxes because of the high wax content of such mixtures. As slack wax is chilled the mass solidifies in the chilling vessel to such an extent that agitation is not feasible and it becomes impossible to cause the chilled mass to flow from the chiller. Moreover, the principle of incremental dilution of the slack wax with deoiling solvent as chilling proceeds cannot always be successfully employed, particularly where the wax content of the slack wax is relatively high, for the same reasons.

It has now been found that the advantages of chilling in the absence of solvent or in the presence of only small amounts of solvent added incrementally during the cooling or chilling operation can be realized, and thus crystallized wax in a form which is readily filterable and readily washed on the filter can be obtained from slack waxes of high wax content, i. e. containing 60% to 98% of wax, by recycling solvent-free filtrate obtained in the deoiling process to the slack wax being treated. The thus diluted slack wax is chilled to the desired deoiling temperature and then mixed with the desired amount of deoiling solvent to permit good filtration. Dilution of the slack wax with the solvent-free filtrate produced in the deoiling process is found to not only permit the separation of the wax in a desirable, readily filterable and washable form but also to result in the separation of higher proportions of wax at a given deoiling temperature than are obtained without the use of recycled filtrate. Correspondingly the foots oil separated from the slack wax will contain a lower proportion of wax and a lower pour point at given deoiling temperature than the foots oil produced by conventional deoiling procedures. Thus economies can be effected, the economies being realized in either a higher production of oil-free wax from a given slack wax or in the ability to employ higher deoiling temperatures thus reducing chilling costs for the recovery of a given yield of oil-free wax. Economies are also realized by reason of the ease of agitation during cooling, ease of filtration and ease of washing of the wax cake on the filter.

Thus, it is an object of this invention to separate wax-oil mixtures, particularly hydrocarbon wax-oil mixtures, containing relatively high proportions of wax into their constituent components by a very simple and economical procedure.

Another object of this invention is to separate oil-free wax from wax-oil mixtures containing from about 60% to about 98% of wax which mixtures include tank bottoms waxes, sucker rod waxes and particularly slack wax, in high yields with relatively low chilling requirements.

A further object of this invention is to provide a deoiling process applicable to slack waxes containing relatively high proportions of wax in which the readily filterable crystalline form of the wax normally obtained by effecting crystallization in the absence of deoiling solvent or in the presence of only small proportions of deoiling solvent is preserved in the presence of the subsequently added deoiling solvent to produce a relatively non-viscous slurry which is readily filterable.

A further object of this invention is to provide a deoiling process applicable to slack waxes in which wax is separated in a form such that it produces wax cakes on filtration which do not crack and are of such compact nature that filtration and washing result in the substantially complete removal of oil and solvent from the wax cake.

Still another object of this invention is to provide a method of deoiling slack waxes which permits the recovery of increased yields of oil-free wax at any given deoiling temperature over those obtained in conventional processes or which permits the use of higher deoiling temperatures to recover the same yields of wax as are obtained in conventional processes.

Other objects and features of this invention will be apparent from the following description of the processes of this invention.

According to this invention improved deoiling of high wax content wax-oil mixtures is obtained by diluting such mixtures prior to chilling with solvent-free filtrate or foots oil, recovered in the deoiling process after filtration to remove wax and evaporation of the solvent. The diluted slack wax is chilled to the filtration or deoiling temperature, preferably without the addition of deoiling solvent, and the chilled mass is then mixed with the desired quantity of deoiling solvent, which is preferably at the temperature of the chilled wax, to produce a slurry which is readily filtered. The deoiling solvent to be employed will be one having good solvent power for mineral oil but a low solvent power for wax so that very little of the crystallized wax will be dissolved. The resulting slurry of crystallized wax in solvent solution of oil filters very rapidly and a compact wax cake is formed on the filter which does not crack during filtration nor while washing with solvent.

A similar, although not necessarily an equivalent result, is obtained when the chilling is effected while adding deoiling solvent incrementally during the chilling operation. In this case the slack wax, diluted with solvent-free filtrate, or foots oil, produced in the process is partially chilled and small amounts of deoiling solvent are then added as the chilling is continued. After the desired deoiling temperature is reached the remainder of the solvent to be used is added. Operation in this manner is sometimes desirable, particularly where the slack wax or other high wax content wax-oil mixture contains large proportions of high melting point wax and/or where the wax-oil mixture is one produced from high viscosity mineral oil fractions or raffinates. In any case, the amount of deoiling solvent added during the cooling or chilling operation will preferably be only that amount necessary to maintain the mixture being chilled in a sufficiently non-viscous form to permit adequate agitation or stirring during the chilling operation.

By the term "solvent-free filtrate" is meant the filtrate recovered in the dewaxing operation after removing all or substantially all of the solvent as by evaporation, stripping, or the like. It is to be understood that small amounts of solvent, 1% or so, will not be objectionable and therefore the term "solvent-free filtrate" will encompass filtrates containing up to about these amounts.

The amount of solvent-free filtrate to be recycled and added to the slack wax being deoiled will depend upon the characteristics of the slack wax and of the oil. In the case of slack waxes obtained from relatively high viscosity mineral oil fractions, or raffinates, the amount of solvent-free filtrate to be recycled may be as high as 80% by weight of the slack wax. This amount may also be recycled in cases where the wax content of the slack wax is high, as for example when it constitutes 70% to 80% or more of the slack wax. Some advantages are obtained by recycling as little as 5% to 10% of the solvent-free filtrate based on the slack wax feed to the deoiling unit. Generally it is preferred to recycle between about 20% and about 60% by volume based on the slack wax of the dewaxed oil obtained in the deoiling process.

Deoiling temperatures, i. e. temperatures at which the slurry of wax in oil-solvent mixtures are filtered will vary with the type of slack wax employed, the melting point of the wax present in the slack wax, the viscosity of the oil from which the slack wax was originally obtained and the proportion of low melting point waxes desired in the oil-free wax recovered. Generally the temperatures of filtration or the so-called deoiling temperatures will be in the range of about 20° F. to about 80° F. and in most instances temperatures between 40° F. and 70° F. appear to permit the removal of optimum proportions of wax in relatively oil-free form.

The amount of deoiling solvent to be employed will be between 0.5 and about 4 volumes per volume of slack wax, i. e. filtrate-free feed to the deoiling process, and the particular amount to be employed in any given case will of course depend upon the characteristics of the slack wax being treated and the proportion of solvent-free filtrate being recycled as would be recognized by one skilled in the art.

Deoiling solvents which may be used in the process of this invention include the low molecular weight aliphatic ketones, such as acetone, methyl ethyl ketone, methyl n-propyl ketone, methyl isopropyl ketone, methyl isobutyl ketone, methyl n-butyl ketone, and diethyl ketones, as well as the several methyl amyl ketones, ethyl propyl ketones and ethyl isobutyl ketones, the ketones employed will preferably contain between 3 and about 6 carbon atoms per molecule. Other deoiling solvents which may be employed and which are effective in carrying out the process of this invention include the propyl, butyl and amyl alcohols; various low molecular weight esters, as for example ethyl acetate, ethyl propionate; esters such as diethyl ether, isopropyl ether and the like; low molecular weight chlorinated hydrocarbons, as for example ethylene dichloride and trichloroethylene. In addition to the single solvents mentioned, mixtures of two or more of the above solvents may be employed in order to obtain a solvent having the most desirable solvent characteristics for use with any given type of slack wax. Thus, it may be desirable in some instances to use a mixture of acetone and/or methyl ethyl ketone with a higher ketone, as for example methyl isobutyl ketone and/or one or more of the methyl amyl ketones. Also the optimum solvent effect of the deoiling solvent is sometimes obtained by using a mixture of a low molecular weight ketone, such as acetone or methyl ethyl ketone with small proportions, as for example 10% to 30% based on the total solvent composition, of an aromatic hydrocarbon solvent, as for example benzene, toluene, xylene and the like. Moreover, the solvent may comprise mixtures of acetone or methyl ethyl ketone with low molecular weight non-aromatic hydrocarbons, as for example butane, pentane, hexane or hydrocarbon fractions containing one or more of these hydrocarbons, such as for example gasoline, particularly casing head gasoline, paraffinic naphtha and the like.

The method of operation of this invention may be better understood by reference to the following description of the drawing. Referring to the drawing, which represents a flow diagram of the process of this invention, a waxy stock of relatively high wax content, as for example a slack wax obtained by dewaxing a selective solvent extracted SAE 50 waxy distillate produced by the vacuum distillation of a Santa Fe Springs crude oil or from the raw distillate or from other raw distillates or raffinates obtained from waxy crude oils, is maintained in tank 1 at a temperature sufficiently high to effect solution of wax contained in the oil. The wax-oil mixture is withdrawn from tank 1 through line 2 controlled by valve 3 and is mixed in line 2 with solvent-free filtrate entering through line 4. The mixture of slack wax and solvent-free filtrate thus obtained is pumped by pump 5 through line 6 into chilling and mixing vessel 7. Vessel 7 is provided with a jacket 8 into which a cooling liquid to cool the wax-oil mixture may be introduced by means of line 9 and removed through line 10. Vessel 7 is also provided with agitating or stirring paddles and scrapers 11 supported on shaft 12 which is rotated by pulley 13 connected to a suitable source of power not shown. The wax-oil mixture is gradually cooled in vessel 7 to the desired temperature while it is constantly stirred by agitating paddles and scrapers. The stirring rate is relatively slow, being merely sufficient to prevent the wax-oil mixture from setting up into a solid, non-fluid mass.

When the desired temperature has been reached the deoiling solvent, i. e. a poor wax solvent such as one mentioned herein is mixed with the wax-oil mixture in order to produce a slurry which filters readily, such solvent may be mixed with the cooled wax-oil mixture in vessel 7 in which case the solvent is withdrawn from tank 14 through line 15 controlled by valve 16 and pumped by means of pump 17 through line 18, cooler 19, line 20 and thence either through line 21 controlled by valve 22 into vessel 7 or through line 23 controlled by valve 24 into vessel 7. Alternatively, the cooled solvent may be passed from line 20 controlled by valve 25 through line 26 and mixed with the cooled wax-oil mixture withdrawn from vessel 7 through line 27 controlled by valve 28 through line 29 by means of pump 30 into line 31. The mixing may be effected in line 31 or if desired in order to produce more efficient mixing of cooled wax-oil mixture and cooled solvent, the mixture may be passed from line 31 through line 32 controlled by valve 33 into mixer 34 and thence through line 35 controlled by valve 36 into line 37. Flow in this manner is obtained by closing valve 38 and opening valve 33.

The slurry of cooled wax-oil and solvent is passed from line 37 through filter 39 where the wax suspended in the slurry is separated from the oil and solvent. The filtrate consisting of oil and solvent from which solid wax has been removed is passed through line 40, valve 41 and heat exchanger 42 where the temperature is raised so as to permit vaporization of the solvent. The preheated solution is then passed through line 43 controlled by valve 44 into an evaporator 45. In the evaporator solvent is vaporized aided by steam which is circulated through closed coil 46, vapors passing through mist extractor 47 are withdrawn through line 48 controlled by valve 49 and passed through condenser 50. The condensed solvent is removed from the condenser through line 51 controlled by valve 52 and pumped by means of pump 53 through line 54 into storage tank 14.

The wax separated in filter 39 is withdrawn via line 55 controlled by valve 56 and pumped by means of pump 57 through line 58 and heat exchanger 59 where it is heated to a sufficiently elevated temperature to effect vaporization of solvent. The heated wax is passed via line 60 controlled by valve 61 into evaporator 62 which is provided with closed heating coil 63 and mist extractor 64. The solvent vapors are removed from the evaporator via line 65 controlled by valve 66 and are passed through line 67 into line 48 for passage to the condenser 50 and returned to the storage tank 14. The solvent-free wax is withdrawn from evaporator 62 via line 68 controlled by valve 69 and pumped by means of pump 70 into storage tank 71.

Prior to removal of the wax cake deposited on filtering element 39 it is preferable to wash the wax cake with a small amount of cooled solvent obtained from tank 14. Solvent may be passed into the filter from line 26 through line 31, valve 38 and line 37. The wash solvent leaving the filter 39 may also be passed through evaporator 45 and returned to storage tank 14.

The filtrate which has been freed of solvent in evaporator 45 is withdrawn through line 72 controlled by valve 73 and pumped by means of pump 74 into line 75. A portion of this solvent free filtrate is passed from line 75 through line 76 controlled by valve 77 and through line 4 into line 2 where it is mixed with the wax-oil mixture, as for example slack wax, being deoiled. The remainder of the solvent free filtrate is passed through line 78 controlled by valve 79 into storage tank 80. Solvent-free filtrate obtained in the deoiling operations described herein is known in the trade as foots oil and these terms are used interchangeably in the present description.

Where it is desired to effect the chilling with incremental addition of deoiling solvent, the wax-oil mixture diluted with solvent-free filtrate is passed into the chiller through line 6 and as the chilling proceeds small, incremental amounts of solvent which have been cooled to the temperature of the wax-oil mixture are added as the chilling progresses. This addition of solvent may be accomplished through the system previously described and may enter the chiller through line 21 or line 23 and after chilling has been completed remaining quantities of cooled solvent may be added through either of these lines or through line 26 in the manner described hereinabove. With the apparatus described it is possible to obtain partial chilling of the feed to chilling and mixing vessel 7 in the upper portion thereof without the addition of solvent and continue the chilling in the lower portion of the column with incremental addition of cooled solvent through line 23. In this case the completely chilled wax-oil mixture containing a portion of the solvent is then mixed with solvent entering through line 26 either in line 31 or in the mixer 34 in the manner previously described.

The following are submitted as specific examples of various modifications of the process forming the subject matter of this invention. It is to be understood however that these examples are not to be construed as limiting this invention but merely as representative processes typical of the invention.

The slack waxes used in the following examples were typical commercial slack waxes prepared by dewaxing selective solvent raffinate obtained from a long residuum from waxy California crude oil. The particular slack waxes employed were fractions of slack wax obtained by fractional distillation of the slack wax from the solvent raffinate. In preparing these slack waxes a California waxy crude oil having a gravity of 33.1° API was topped to a Saybolt Universal viscosity at 210° F. of about 250 seconds. This long residuum was then deasphalted and solvent extracted using a combination treatment with propane and a selective solvent consisting of a mixture of phenol and cresols to obtain a deasphalted solvent raffinate. This raffinate had a gravity of 30.1° API and a viscosity of 57.4 SSU at 210° F. This waxy raffinate containing about 31% by weight of wax was then dewaxed using propane as the dewaxing solvent at temperatures of about —40° F. to obtain slack wax containing about 29.5% of oil. Depending upon the dewaxing process employed the oil content will be between about 5% and 35% by weight. Typically slack waxes prepared in this manner will contain between about 25% and about 30% by weight of oil. The slack wax produced as above was then fractionally distilled to produce three overhead fractions which will be referred to hereinafter as streams 0, 1 and 2 and a bottoms fraction. Typical tests on each of these fractions of slack wax are shown in Table 1.

TABLE 1

|  | Percent | Gravity, API | Viscosity, SU at 210° F. | Percent Oil |
| --- | --- | --- | --- | --- |
| Stream 0 | 25 | 38.3 | 38.4 | 36.7 |
| Stream 1 | 25 | 36.8 | 42.8 | 32.0 |
| Stream 2 | 40 | 34.9 | 54.3 | 29.7 |
| Bottoms | 10 | 27.6 | 113.3 | 21.9 |

EXAMPLE I

A. *Deoiling without recycling of solvent-free filtrate*

For purposes of comparison with the deoiling process of this invention 100 parts by weight of stream 0 wax produced as above described and containing 36.7% oil and having a melting point of approximately 120° F. was charged to the chilling and mixing vessel 7 at a temperature of 150° F., at which temperature the wax present in the slack wax was completely dissolved and this slack wax was cooled to 60° F. at the rate of 1° F. per minute. During cooling the contents of the chilling vessel were constantly stirred by means of the agitating paddles which were rotated at a moderate rate sufficient to prevent the wax mass from setting up into a solid mass. Also during the chilling, 20 parts by weight of methyl ethyl ketone were added when crystallization started in order to maintain the mass sufficiently fluid to permit agitation. Although the addition of one 20% increment of solvent permitted chilling to 60° F., the mass at this temperature was extremely viscous and would be difficult to handle in large scale commercial chillers. Following the chilling an additional 240 parts by weight of methyl ethyl ketone, cooled to 60° F., was added to and mixed with the chilled slack wax to obtain a slurry consisting of well defined wax crystals in suspension in an oil-solvent solution. The slurry was then filtered and the wax cake washed on the filter using a total of 410 parts by weight of methyl ethyl ketone as the wash solvent. The slurry filtered at a satisfactory rate and gave a uniform, uncracked wax cake which washed readily and from which solvent and oil was substantially completely removed on the filter. After removing solvent from the washed wax cake, the wax had a melting point (Galician) of 126.5° F. The yield of wax amounted to 45.4% by weight based on the slack wax feed.

Attempts to chill this stream 0 slack wax to 60° F. without the addition of a small amount of deoiling solvent during the chilling resulted in semi-solid masses which could not be successfully agitated.

B. Deoiling with recycling of 25% by weight of solvent-free filtrate

Since in a continuous deoiling process involving recycling of foots oil to dilute the slack wax feed prior to chilling or cooling, when equilibrium conditions are reached, the solvent-free filtrate recycled would be that solvent-free extract recovered from a process in which a mixture of slack wax and solvent-free extract were treated to recover oil-free wax, a series of deoiling operations were carried out using in each instance the solvent-free extract recovered in the preceding stage as diluent for the slack wax in the succeeding deoiling stage. In each deoiling stage the same stream 0 slack wax was used and identical conditions were maintained, the conditions employed being those described in part A of this example; the only variation being that the foots oil or solvent-free filtrate recovered in the preceding stage was employed to dilute the slack wax in each succeeding step.

In stage 1, 25 parts by weight of solvent-free filtrate recovered in part A of this example was added to and mixed with 100 parts by weight of stream 0 slack wax prior to chilling. In stage 2, 25 parts by weight of the solvent-free filtrate from stage 1 was added to 100 parts by weight of stream 0 slack wax prior to chilling. Similarly in stage 3 the solvent-free filtrate from stage 2 was used and in stage 4 the solvent-free foots oil from stage 3 was employed, the amount being the same as used in stages 1 and 2. In these operations the addition of 20% of deoiling solvent during the chilling gave a mass which was readily agitated at 60° F. which was the temperature of filtration.

The yields and results of tests on the deoiling wax recovered in four successive stages carried out in the manner indicated are shown in Table 2. For comparison, the corresponding data for the wax produced in part A, without recycle of solvent-free extract are shown.

TABLE 2

| Deoiling Process | Melting Point of Wax, ° F., (Galician) | Yield of Wax Based on Slack Wax, Percent by Weight |
| --- | --- | --- |
| Part A (without recycle) | 126.5 | 45.4 |
| Stage 1 (with 25% foots oil recycle) | 127.0 | 48.8 |
| Stage 2 (with 25% foots oil recycle) | 127.0 | 48.7 |
| Stage 3 (with 25% foots oil recycle) | 127.0 | 48.7 |
| Stage 4 (with 25% foots oil recycle) | 127.0 | 47.8 |

From the above it will be seen that by recycling 25% by weight of solvent-free filtrate to the slack wax entering the chiller the yield of wax recovered is greater than the yield of wax obtained without such dilution.

C. Deoiling with recycling of 75% by weight of solvent-free filtrate

Following the same deoiling procedures, using the same stream 0 slack wax and the same conditions as described in part B of this example, except that 75% by weight of solvent-free filtrate based on the slack wax being deoiled was added to the slack wax, a series of experiments was carried out to determine the effect of recycling relatively large proportions of solvent-free filtrate. As in part B of this example, four deoiling stages were employed in order to simulate continuous operation. In the first stage, solvent-free filtrate obtained in part A of this example was used and in subsequent stages the filtrate from the preceding stage was employed.

Data regarding the yield and melting point of waxes recovered in the four stages are shown in Table 3.

TABLE 3

| Deoiling Process | Melting Point of Wax, ° F., (Galician) | Yield of Wax Based on Slack Wax, Percent by Weight |
| --- | --- | --- |
| Part A (without recycle) | 126.5 | 45.4 |
| Stage 1 (with 75% foots oil recycle) | 126.0 | 52.2 |
| Stage 2 (with 75% foots oil recycle) | 127.0 | 49.9 |
| Stage 3 (with 75% foots oil recycle) | 127.0 | 50.4 |
| Stage 4 (with 75% foots oil recycle) | 127.0 | 50.1 |

D. Deoiling with recycling of 75% by weight of solvent-free filtrate without incremental dilution with deoiling solvent Part C of this example was repeated but without adding any deoiling solvent during the chilling. The entire amount of deoiling solvent, 260 parts per part of stream 0 slack wax, was added to and mixed with the chilled wax mixture. No difficulty was experienced in agitating the chilled mass before dilution with solvent.

Yields of wax from each of the four stages were substantially identical to the yields shown in Table 3.

EXAMPLE II

A sample of stream 2 slack was prepared as described hereinabove, having an oil content of 29.7% and a melting point of 145° F., was deoiled with and without dilution prior to chilling with solvent-free extract or foots oil recovered from this stream 2 wax.

A. Deoiling without recycling of solvent-free filtrate

In effecting deoiling without dilution with recycled foots oil 100 parts by weight of the stream 2 slack wax heated to a temperature of 175° F. was cooled at the rate of approximately 1° F. per minute to a temperature of 70° F., the deoiling temperature. During the cooling two increments of 20 parts each of deoiling solvent were added, the first at the point of incipient crystallization and the second after a substantial amount of crystallization had occurred. The deoiling solvent employed consisted of 10% by volume of methyl isobutyl ketone and 90% by volume of methyl ethyl ketone.

After the wax and solvent had been cooled to 70° F. an additional 220 parts by weight of the deoiling solvent, cooled to 70° F., was added to the cooled wax. The resulting slurry was filtered and washed on the filter with 410 parts by weight of the same deoiling solvent. Yield and melting point data on the wax recovered are shown in Table 4. The combined filtrate and washings were topped to remove solvent and a portion of the solvent-free filtrate or foots oil was used in the deoiling processes described herebelow.

B. Deoiling with recycling of 20% by weight of solvent-free filtrate

Another portion of the same stream 2 slack wax was deoiled after first diluting it with 20 parts of solvent-free filtrate produced in part A of this example per 100 parts of stream 2 slack wax. The conditions of treatment including the type of solvent, amount of solvent and wash, temperature of filtration and the like were the same as those described hereabove. Yield data and melting point data on the oil-free wax recovered in this process are presented in Table 4.

The above experiment was repeated using the principle of dilution of the stream 2 slack wax with 20% by weight of solvent-free filtrate from part A of this example. However, in this case chilling was effected in the complete absence of deoiling solvent following chilling to 70° F. A total of 260 parts by weight of deoiling solvent per 100 parts of slack wax was added at 70° F. and the mixture filtered, the wax being washed on the filter as indicated in part A of this example. Yield and melting point data for the wax recovered are shown in Table 4.

C. *Deoiling with recycling of 40% by weight of solvent-free filtrate*

Stream 2 wax was deoiled following the procedure just described, except that 40 parts of foots oil per 100 parts of slack wax was used in the initial dilution before cooling.

The above experiment was repeated using the principle of dilution of the slack wax with 40% of foots oil but in this case chilling of the slack wax-foots oil mixture was effected in the complete absence of deoiling solvent. The mixture was chilled to 70° F. with agitation and following chilling 260 parts of deoiling solvent per 100 parts of slack wax was added to produce a slurry preparatory to filtration. Following filtration the slack wax cake on the filter was washed with 410 parts by weight of the same deoiling solvent.

Data on the oil-free waxes recovered in each of the above experiments are shown in the following table:

TABLE 4

| Deoiling Process | Melting Point of Wax, ° F., (Galician) | Yield of Wax Based on Slack Wax, Percent by Weight |
|---|---|---|
| Deoiling without recycle | 153.5 | 44.3 |
| Deoiling with recycle of 20% foots oil and incremental dilution | 152.5 | 45.9 |
| Deoiling with recycle of 20% foots oil without incremental dilution | 152.6 | 46.0 |
| Deoiling with recycle of 40% foots oil and incremental dilution | 152.8 | 48.1 |
| Deoiling with recycle of 40% foots oil without incremental dilution | 152.7 | 48.0 |

From the above it will be observed that at a given deoiling temperature the yield of wax recovered increases appreciably using the principle of recycling of solvent-free extract to the slack wax being deoiled. Moreover, as the proportion of foots oil recycled is increased the yield of oil-free wax recovered at a given filtration temperature is also increased.

EXAMPLE III

A bottoms fraction obtained by distillation of a slack wax produced as described hereinabove, having an oil content of about 3% by weight and a melting point of about 163° F., was deoiled with and without addition of foots oil or solvent-free filtrate prior to cooling to determine the effect of such dilution on yield of oil-free wax at a given deoiling temperature.

The bottoms fraction slack wax, 100 parts by weight, was heated to a temperature of about 200° F. to effect solution of the wax in the oil or at least liquification of the wax and then cooled to 70° F. which was the temperature of filtration. During the cooling 20 parts by weight of deoiling solvent, methyl isobutyl ketone, was added and following the cooling an additional 240 parts by weight of deoiling solvent at 70° F. was added. It should be pointed out that although incremental dilution with deoiling solvent was used in this instance, at 70° F. the mass was solid and would not have been successfully handled in large scale chilling apparatus. Following filtration the wax was washed on the filter with 460 parts of cooled methyl isobutyl ketone. Data regarding the yield of oil-free wax and its melting point are presented in Table 5.

The above experiment was repeated except that 37 parts by weight of solvent-free filtrate, obtained by evaporating solvent from the filtrate obtained in the above deoiling process, was added to 100 parts by weight of bottoms slack wax prior to chilling. In this case the chilled mass, prior to the addition of the remainder of the deoiling solvent was fairly liquid and would be readily handled in chilling apparatus. Yield and melting point data on the solvent-free wax obtained are shown in the following table:

TABLE 5

| Deoiling Process | Melting Point of Wax, ° F., (Galician) | Yield of Wax Based on Slack Wax, Percent by Weight |
|---|---|---|
| Deoiling without recycle | 173.2 | 41.7 |
| Deoiling with recycle of 30% foots oil | 171.0 | 47.2 |

The above experiments were repeated using a deoiling solvent consisting of approximately 40% toluene and 60% acetone and the results obtained correspond closely with those obtained using methyl isobutyl ketone as the solvent.

EXAMPLE IV

The deoiling procedures described in Example II were repeated except that no deoiling solvent was added during the cooling of the slack wax-foots oil mixtures. The products filtered readily and the resulting wax cakes were efficiently washed on the filter. The results obtained corresponded closely with those obtained and shown in Example II.

The foregoing explanatory description of our invention is not to be considered as limiting since many variations may be made within the scope of the following claims by those skilled in the art without departing from the spirit therefo. It will be observed that in the foregoing description of the drawing, only single pieces of apparatus have been shown for carrying out the process. It is to be understood that duplicate equipment may be provided where necessary, which may be operated alternately, so that the process may be carried out more or less continuously.

We claim:

1. A process for deoiling wax-oil mixtures containing about 60% to about 98% wax, which comprises bringing said mixtures to a temperature sufficient to dissolve the wax in the oil, adding a diluent consisting of foots oil recovered in said process to said wax-oil solution, cooling the resulting diluted wax-oil solution with agitation to crystallize wax and to produce a mass which is fluid at said cooling temperature, commingling said cooled fluent wax-oil mass with a cooled solvent to dissolve the oil present, separating the solvent solution of oil as filtrate from the crystallized wax, evaporating solvent from said filtrate to leave a foots oil and recycling a portion of said foots oil as said diluent for the wax-oil mixture to be separated.

2. A process for deoiling wax-oil mixtures containing about 60% to about 98% of wax which comprises bringing said mixtures to a temperature sufficient to dissolve said wax in said oil, adding a diluent consisting of foots oil recovered in said process to said wax-oil solution, cooling the resulting wax-oil solution with agitation in the absence of any deoiling solvent to a temperature sufficiently low to crystallize wax and to produce a mass which is fluid at said cooling temperature, commingling said cooled fluent wax-oil mass with a cooled solvent to dissolve the oil present, separating the solvent solution of oil as filtrate from the crystallized wax, evaporating solvent from said filtrate thereby leaving foots oil as a residue and recycling a portion of said foots oil as said diluent for the wax-oil mixture to be separated.

3. A process for the separation of substantially oil-free wax from wax-oil mixtures containing about 60% to about 98% of wax which comprises bringing said mixtures to a temperature sufficient to dissolve said wax in said oil, adding to the resulting wax-oil solution a diluent consisting of foots oil recovered in said process, cooling the diluted wax-oil solution with slow agitation to cause crystallization of wax, at least a part of said cooling being effected in the presence of a quantity of solvent less than the total quantity of solvent to be employed in the wax separation process, to produce a mass which is fluid at said cooling temperature, commingling said cooled fluent wax-oil-solvent mixture with the remainder of the solvent to be used in the wax separation process, which solvent has been cooled to the temperature of the wax-oil solvent mixture, to dissolve the oil present, separating the solvent solution of oil as filtrate from the crystallized wax, evaporating solvent from said filtrate thereby leaving foots oil as a residue and recycling a portion of said foots oil as diluent to the wax-oil mixture to be separated.

4. A process according to claim 1 in which said wax-oil mixture is a slack wax and the amount of foots oil recycled is between about 5% and about 80% by weight of said slack wax.

5. A process according to claim 1 in which the ratio of solvent to wax-oil mixture is between 0.5 and 4 to 1.

6. A process according to claim 3 in which the amount of solvent added to the diluted wax-oil solution is only that amount required to maintain the wax-oil mixture being cooled and agitated in a fluid condition.

7. A process according to claim 1 in which said solvent comprises methyl ethyl ketone.

8. A process according to claim 1 in which said solvent comprises methyl isobutyl ketone.

References Cited in the file of this patent

UNITED STATES PATENTS

| | | |
|---|---|---|
| 2,370,297 | Engel | Feb. 27, 1945 |
| 2,571,752 | Overbaugh | Oct. 16, 1951 |
| 2,612,465 | Kiersted et al. | Sept. 30, 1952 |
| 2,654,692 | Kiersted et al. | Oct. 6, 1953 |
| 2,658,852 | Tiedje et al. | Nov. 10, 1953 |
| 2,696,459 | Benedict | Dec. 7, 1954 |